United States Patent [19]
Matsuura et al.

[11] Patent Number: 5,143,767
[45] Date of Patent: Sep. 1, 1992

[54] PROCESSES FOR PREPARING ELECTRET FILTERS

[75] Inventors: Satoshi Matsuura; Masayuki Mito; Yoshio Shinagawa, all of Kuga, Japan

[73] Assignee: Mitsui Petrochemical Industries, Ltd., Tokyo, Japan

[21] Appl. No.: 296,000

[22] Filed: Jan. 12, 1989

[30] Foreign Application Priority Data

Jan. 12, 1988 [JP] Japan .................... 63-4464
Jan. 28, 1988 [JP] Japan .................... 63-17969

[51] Int. Cl.$^5$ .................... B32B 5/26; B32B 7/10; B32B 31/08; B32B 31/20
[52] U.S. Cl. .................... 428/109; 55/521; 55/525; 55/528; 156/209; 156/308.2; 264/22; 428/172; 428/174; 428/195; 428/198; 428/236; 428/255; 428/288; 428/296; 428/302
[58] Field of Search .................... 264/22; 428/302, 288, 428/109, 172, 174, 195, 198, 236, 255, 296; 156/209, 308.2; 55/521, 525, 528

[56] References Cited

U.S. PATENT DOCUMENTS

| | | | |
|---|---|---|---|
| 4,302,495 | 11/1981 | Marra | 428/302 |
| 4,363,682 | 12/1982 | Thiebault | 156/181 |
| 4,601,937 | 7/1986 | Latussek | 428/302 |
| 4,851,277 | 7/1989 | Valkenberg et al. | 428/288 |
| 4,874,659 | 10/1989 | Ando et al. | 264/22 |

FOREIGN PATENT DOCUMENTS

0038743 4/1981 European Pat. Off.
2614160 10/1977 Fed. Rep. of Germany.

*Primary Examiner*—James C. Cannon
*Attorney, Agent, or Firm*—Sherman and Shalloway

[57] ABSTRACT

Provided herein is a process for preparing an electret filter which comprises feeding a non-woven fabric composed of an electrically charged web of synthetic fibers through a nip of co-operating embossing and flat rolls under pressure and at a temperature below a softening temperature of said synthetic fibers, thereby subjecting the surface of said non-woven fabric to partical fusion bonding and integration.

19 Claims, 1 Drawing Sheet

PROCESSES FOR PREPARING ELECTRET FILTERS

FIELD OF THE INVENTION

This invention relates to processes for preparing filters of electrically charged nonwoven fabrics of synthetic fiber (hereinafter the filters are sometimes called electret filters) and more particularly to processes for preparing electret filters composed of electrically charged nonwoven fabrics of synthetic fiber and used in filtration of gases, which filters do not make a dust by themselves and which are readily adaptable for pleating.

The invention further relates to reinforced-type electret filters which are easy of handling and which have improved mechanical strength and self-supporting properties, and to processes for preparing the same.

BACKGROUND OF THE INVENTION

Filters for filtering gases provided in a clean room for use in the manufacture of integrated circuits or in a cooled air circulating duct in a driving apparatus for floppy discs are required to have such performance that they catch a fine dust that is elusive by the use of commercially available common filters. Concretely speaking, filters for filtering gases under present conditions are required to catch a dust having a diameter of larger than 0.3 μm, and with the progress of high densification of integrated circuits, there is a strong and growing demand for high-performance filters capable of catching a dust finer than that mentioned above.

As fully demonstrated, for example, in Japanese Patent L-O-P Publn. No. 225416/1985, electrically charged synthetic fiber nonwoven fabrics have widely been used as filters for catching such finer dust as mentioned above.

Requirements for electret filters are such that the filters maintain stably and continuously their state of being highly densified with electrical charge over an extended period of time and, at the same time, they are free from a phenomenon of making dust by themselves, that is, self-dusting properties.

Under the circumstances, electrically charged synthetic fiber nonwoven fabrics have been subjected to needle punch treatment in order to prevent the nonwoven fabrics constituting electret filters from falling into pieces. When the electrically charged synthetic fiber fabrics are subjected to needle punch treatment, however, parts of the fibers of the nonwoven fabrics are cut in some cases, resulting in a serious problem that the cut fibers from the determining cause of the self-dusting properties of the electret filters as aforesaid.

In the needle punch treated electret filters, the surface thereof is fluffy, and this is considered to be one of the causes of the self-dusting properties. Further, the needle punch treated filters had such a problem that difficulty is involved when the filters are subjected to pleating (gathering), because they cannot be made thin and are poor in toughness.

On the one hand, it is thought of as possible to integrate electrically charged synthetic fiber nonwoven fabrics into a solid structure by means of ultrasonic bonding, but it has been found that difficulty is involved in pleating the ultrasonic bonded electret filters, because the filters cannot be made thin and are poor in toughness.

In order to solve such problems as mentioned above, it is thought of as possible to integrate the nonwoven fabrics constituting the electret filter into a solid structure by subjecting the electrically charged synthetic fiber nonwoven fabrics to heat bonding, but it was considered that when the electrically charged synthetic fiber nonwoven fabrics are heat bonded, the electrical charge once imparted to the synthetic fiber nonwoven fabrics would come to markedly decrease at the time of heating.

Accordingly, there has been earnestly desired the advent of such a process wherein electrically charged synthetic fiber nonwoven fabrics can be integrated into a strong solid structure and used as filters without largely decreasing the electrical charge imparted to said nonwoven fabrics.

Electret filters comprising the electrically charged synthetic fiber nonwoven fabrics integrated into a solid structure are used as filters for air conditioner, because the filters have a fairly acceptable strength for their small thickness and a good performance of catching dust particles.

However, such electret filters sometimes break or spread at the time of fabrication process thereof, because the filters are insufficient in mechanical strength.

Because of lack of self-supporting properties, the above-mentioned electret filters were sometimes found to be difficult to handle particularly when they are stacked.

With the view of obviating such difficulties as mentioned above, there have heretofore been proposed and known reinforced type electret filters prepared by ultrasonic bonding the four sides of the filter to a net made of polyethylene terephthalate as a packing material. However, this ultrasonic bonding is difficult to perform and, moreover, there were such problems that the reinforced type electret filters are low in self-supporting properties and difficult to handle, because only four sides of the electret filters are bonded to the polyethylene terephthalate net as a packing material while the greater part of the nonwoven fabrics constituting the filter are not bonded to said net.

In light of such circumstances as mentioned hereinbefore, there has been strongly desired an advent of electret filters which are of easy handling by virtue of improved mechanical strength and self-supporting properties, and of a process for preparing the same.

OBJECT OF THE INVENTION

The present inention is intended to solvent such problems associated with the prior art as mentioned above, and it is an object of the invention to provide processes for preparing electret filters which are free from self-dusting properties and can be formed to a small thickness but still retaining toughness and also can be adapted for pleating and, moreover, in which the electrical charge imparted to the electrically charged synthetic fiber nonwoven fabrics constituting the filters does not decrease largely.

A further object of the invention is to provide reinforced type electret filters which are designed to be of easy handling by improved mechanical strength and self-supporting properties of the filters, and processes for preparing the same.

SUMMARY OF THE INVENTION

The process for preparing electret filters of the present invention comprises feeding an electrically charged nonwoven fabric composed of a synthetic fiber web under the conditions of a temperature below a softening temperature of said synthetic fiber to co-operating embossing and flat rolls and integrating said nonwoven fabric by subjecting the surfaces of said nonwoven fabric to partial fusion bonding while passing said nonwoven fabric under pressure through between said rolls.

The reinforced type electret filters of the present invention comprise a nonwoven fabric composed of an electrically charged synthetic fiber web and a reticular product composed of a synthetic fiber, wherein all the contacting portions of the nonwoven fabric and the synthetic fiber constituting the reticular product are thermowelded.

The process for preparing reinforced type electret filters of the present invention comprises feeding an electrically charged nonwoven fabric composed of a synthetic fiber web under the conditions of a temperature below a softening temperature of said synthetic fiber, together with a reticular product composed of a synthetic fiber, to co-operating embossing and flat rolls, integrating said nonwoven fabric by partially thermowelding the surfaces of said nonwoven fabric while passing said nonwoven fabric through between said rolls, and simultaneously integrating said nonwoven fabric and said reticular product into a solid structure by theremowelding almost all the contacting portions of said nonwoven fabric and said synthetic fiber constituting said reticular product.

Figure 1:
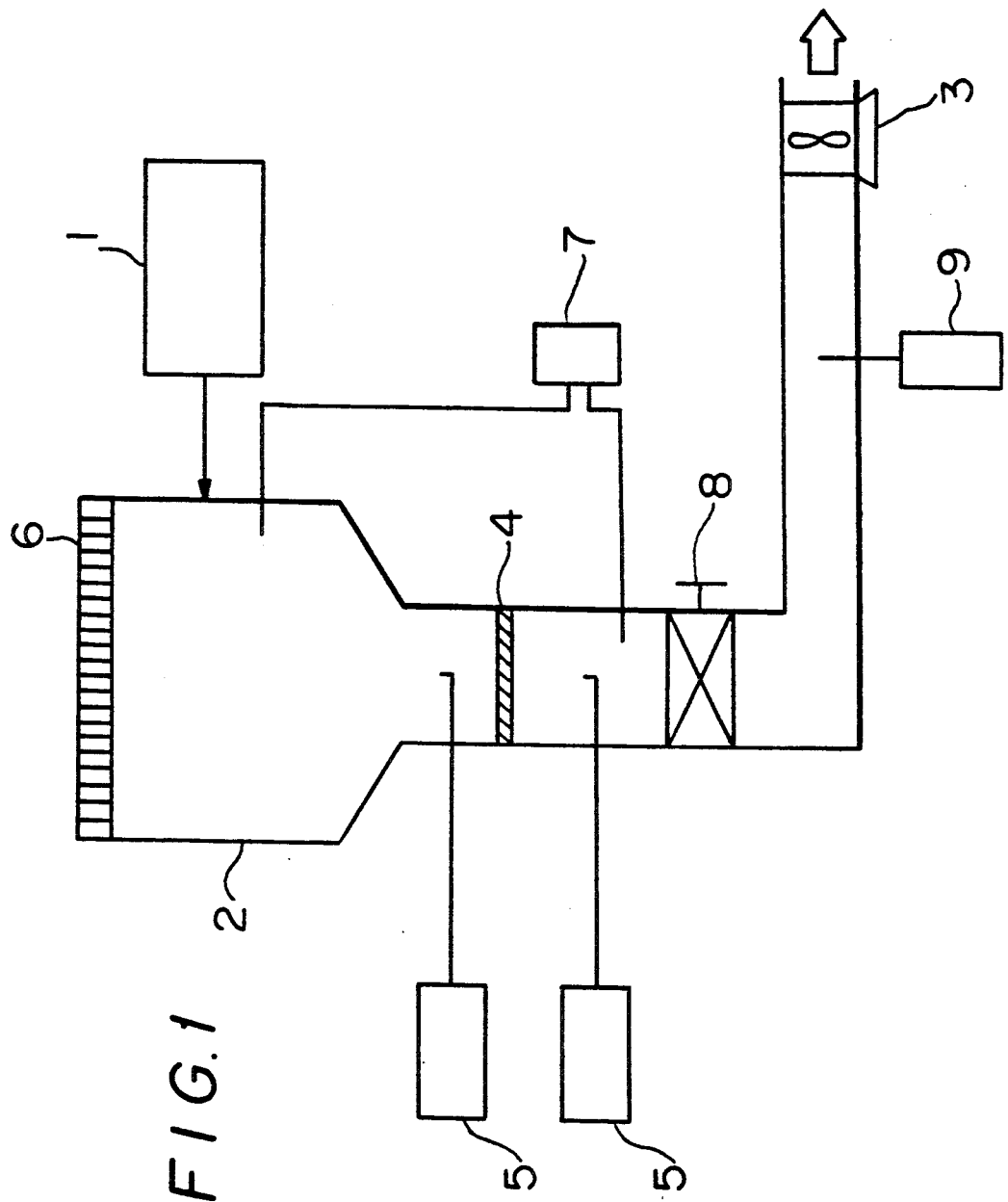
FIG. 1 is a rough sketch showing an apparatus for evaluating filtering performance of filters.

1 ... Aerosol generator
2 ... Chamber
3 ... Blower
4 ... Electret filter
5 ... Particle counter
6 ... Clean air filter
7 ... Pressure gauge
8 ... Air flow control valve
9 ... Air flow meter

DETAILED DESCRIPTION OF THE INVENTION

The process for preparing electret filters of the present invention, reinforced type electret filters of the invention and the process for preparing the same are illustrated below in detail.

In preparing filters according to the present invention, electrically charged synthetic fiber webs which can be used as raw fabrics may be nonwoven fabrics composed of electrically charged synthetic fiber webs which have been widely used hitherto in the preparation of electret filters. The nonwoven fabrics composed of synthetic fiber webs may be electrically charged by any treatment known, per se.

The nonwoven fabric composed of electrically charged synthetic fiber webs have a weight of 10–150 g/m$^2$, preferably 70–130 g/m$^2$.

The nonwoven fabrics composed of electrically charged synthetic fiber webs desirably have a surface charge density of $10-40 \times 10^{-9}$ coulomb/cm$^2$, preferably $25-35 \times 10^{-9}$ coulomb/cm$^2$.

Usable as the electrically charged synthetic fiber webs mentioned above are concretely those disclosed, for example, in Japanese Patent L-O-P Publn. No. 225416/1985.

In the present invention, the desired filters are obtained by feeding a nonwoven fabric composed of such an electrically charged synthetic fiber web as mentioned above to co-operating embossing and flat rolls under the conditions of a temperature below a softening temperature of said synthetic fiber, and integrating said nonwoven fabric by partially fusion bonding the surfaces of said nonwoven fabric while passing said nonwoven fabric through between said rolls under pressure.

At the time when the nonwoven fabric composed of the electrically charged synthetic fiber web is fed to between the embossing rolls, the temperature used in the temperature conditions is below a softening temperature of said synthetic fiber, and more particularly said temperature used is lower by 5°–50° C., preferably 20°–30° C. than the softening temperature of said synthetic fiber.

In feeding the nonwoven fabric composed of the electrically charged synthetic fiber web to between the embossing rolls, the electrical charged imparted to the web is sometimes lost when the temperature used at that time is higher than the softening temperature of said synthetic fiber, though said nonwoven fabric is integrated assuredly into a solid structure. In that case, when the temperature used is lower by more than 50° C. than the softening temperature of the synthetic fiber constituting the nonwoven fabric, on the other hand, said nonwoven fabric is sometimes not integrated sufficiently into a solid structure.

Concretely speaking, because a softening temperature of an electrically charged synthetic fiber web composed of polypropylene as a base mixed with polycarbonate and maleic acid-modified polypropylene is about 150° C., the temperature conditions of about 120°–140° C. are employed at the time when the nonwoven fabric composed of the electrically charged synthetic fiber web is processed by means of the embossing rolls.

The nonwoven fabric composed of the electrically charged synthetic fiber web is fed between co-operating embossing and flat rolls, and said nonwoven fabric is nipped between said rolls, whereupon said nonwoven fabric is softened at the embossed portions and fusion bonded even at a temperature below the softening temperature of said synthetic fiber. When the nonwoven fabric composed of the aforesaid web is fusion bonded at a temperature below the softening temperature of the synthetic fiber constituting said web, only the embossed surfaces of said nonwoven fabric are fused, and the imparted electrical charge remains without practical loss in the non-embossed portions and interlayer of said nonwoven fabric, whereby no electrical charge practically disappears from the web. Accordingly, the filter having an excellent dust-catching performance is obtained.

Further, because the synthetic fiber of the surface portion of the web fused at the time of embossing permeates more or less into the non-fused portion of the web, said web may assuredly be integrated into a solid structure and, at the same time, self-dusting of the web is inhibited.

Co-operating embossing and flat rolls used in integrating the nonwoven fabric composed of the electrically charged synthetic fiber web may be so designed that the emboss ratio of the resulting filter, that is, the proportion of the embossed portion of the filter to the total surface area of the filter, becomes 2–35%, preferably 3–10%.

If the emboss ratio of the resulting filter exceeds 35%, the dust-catching ability of the filter sometimes decreases and, on the other hand, if said emboss ratio is less than 3%, the web constituting the filter is sometimes integrated insufficiently into a solid structure.

The electret filters obtained by the process of the present invention in the manner as illustrated hereinbefore are capable of being formed into a thin film shape and, moreover, they are readily adaptable for bending fabrication, i.e. pleating, because they have excellent toughness. In addition thereto, because the electrical charge imparted to the web does not practically disappear at the time of integration processing, the resulting filter has excellent dust-catching properties. Further, because the synthetic fiber web itself is not cut in the manner as observed in the case where the web is integrated by means of needle punch into a solid structure, the electret filter of the present invention has such extremely excellent performance that the filter is practically lacking in self-dusting properties.

Subsequently, the reinforced type electret filters of the present invention are illustrated hereinafter. This reinforced type electret filter is composed of a nonwoven fabric composed of an electrically charged synthetic fiber web and a reticular product made of a synthetic fiber, and integrated into a solid structure by thermowelding almost all the contacting portions of the nonwoven fabric and the synthetic fiber constituting said reticular product. Further, the nonwoven fabric itself is also integrated by partially fusion bonding the surface thereof.

The nonwoven fabric composed of the electrically charged synthetic fiber web used in this reinforced type electret filter of the present invention is the same as mentioned above.

The net-like product made of a synthetic fiber used includes concretely those made of polypropylene type fiber or polyethylene type fiber, and particularly preferred is the reticular product made of polypropylene type fiber. The synthetic fiber used in the present invention includes those having usually 0.1–10 deniers.

The reticular product as mentioned above desirably has a weight of 30–100 g/m$^2$, preferably 50–80 g/m$^2$. In the present invention, the shape of the reticular product is not particularly limited, but the size of network is represented by a diagonal line of 3–10 mm, and the size of synthetic fiber constituting the reticular product is about 10–1000 deniers.

In the present invention, the reticular product in which level crossings of synthetic fibers constituting the net work are thermowelded are preferably used.

Such reinforced type electret filters as mentioned above may be obtained, for example, by feeding a nonwoven fabric composed of an electrically charged synthetic fiber web, together with a reticular product made of a synthetic fiber, under the temperature conditions of a temperature below a softening temperature of said synthetic fiber to between co-operating embossing and flat rolls, integrating said nonwoven fabric by partially fusion bonding the surface of said nonwoven fabric while nipping said nonwoven fabric and said reticular product by said rolls under pressure, and simultaneously integrating said nonwoven fabric and said reticular product into a solid structure by thermowelding all the contacting portions of said nonwoven fabric and the synthetic fiber of said reticular product.

As mentioned above, the reticular product made of a synthetic fiber and the nonwoven fabric composed of an electrically charged synthetic fiber web are fed between the rolls at a temperature below a softening temperature of said synthetic fiber constituting said web, and more particularly at a temperature lower by 5°–50° C., preferably 20°–30° C. than the softening temperature of said synthetic fiber.

The reticular product made of a synthetic fiber and the nonwoven fabric composed of the electrically charged synthetic fiber web are fed between co-operating embossing and flat rolls and are nipped by said rolls under pressure, whereupon said nonwoven fabric is softened and thermowelded even at a temperature below the aforesaid softening temperature and, at the same time, almost all the contacting portions of said nonwoven fabric and the synthetic fiber constituting said reticular product are thermowelded and said nonwoven fabric and said reticular product are integrated into a solid structure.

When the nonwoven fabric composed of the synthetic fiber web and the synthetic fiber of the reticular product are thermowelded in the manner as mentioned above, only the surfaces of embossed portions of the resulting filter are fused, and the electrical charge imparted to said filter remains without practical loss in the non-embossed portions and interlayer of the filer and the electrical charge does not practically disappear from the web. Accordingly, the filter having an excellent dust-catching performance is obtained.

The synthetic fiber of the surface portion of the web fused at the time of embossing more or less permeates into the non-fused portions of the web, the integration of the web into a solid structure is carried out assuredly and, at the same time, self-dusting of the resulting filter is inhibited.

The nonwoven fabric integrated with the above-mentioned reticular product into a solid structure is taken up usually at a take-up speed of 1–20 m/min.

The electret filter thus prepared has a solid structure wherein the reticular product made of a synthetic fiber is push-fitted by thermowelding to the nonwoven fabric composed of a synthetic fiber web.

Such reinforced type electret filters as illustrated above are capable of being formed into a thin film-like or sheet-like shape and, moreover, excellent in mechanical strength and self-supporting properties by virtue of a solid structure wherein the nonwoven fabric composed of an electrically charged synthetic fiber web and the reticular product are integrated together by thermowelding almost all the contacting portions of said nonwoven fabric and the fiber of said reticular product. Therefore, the filters do not involve such problems as breakage or stretching at the time of the subsequent fabrication are easy to handle. By virtue of the above-mentioned structure, the reinforced type electret filters are excellent in toughness, and hence are readily adaptable for bending fabrication, i.e. pleating. Furthermore, the reinforced type electret filters have such an advantage that when they are in use, not a sound of the wind passing therethrough is heard, because the nonwoven fabric and the reticular product are thermowelded to integrate them throughout.

The reinforced type electret filters have an excellent dust-catching performance, because the electrical charge imparted thereto remains without practical loss at the time of the integrating fabrication thereof.

In the process for preparing the reinforced type electret filters of the present invention, because the nonwoven fabric and the reticular product are integrated into a solid structure by thermowelding technique, this processing operation is very simple as compared with the conventional ultrasonic welding technique.

The electret filters and reinforced type electret filters as illustrated hereinbefore may be used as filters for clean rooms, for home use air cleaners, for filtering gases in a floppy disc driving apparatus and the like.

The present invention is illustrated below with reference to examples, but it should be construed that the invention is in no way limited to those examples.

EXAMPLES 1-7

A resin composition comprising 90% by weight of polypropylene, 5% by weight of polycarbonate and 5% by weight of maleic anhydride graft-modified polypropylene was molded by the blown-film extrusion method into a tubular film of 30 μm in wall thickness.

Both ends of this tubular film were flattened and continuously cut to obtain 2 sheets of film of 300 mm in width. The electrically charged film was stretched with a hot roll at a temperature of 110°-130° C. in the lengthwise direction at a drawing ratio of about 6-8 times to prepare a stretched film of 10-20 μm in thickness. Each of the films thus obtained was electrically charged under the conditions of an applied voltage of 8 KW (DC), a distance of 9 mm between electrodes, and a corona discharge electrode retention time of 0.8 seconds.

The stretched and electrically charged film was fibrillated with a needle roll at various splitting ratios into a rectangular form, followed by reeling up on a drum.

The fibrillated fiber was cut by a cutter to a fiber length of 90 mm and processed with a cotton opener into a cotton form.

The cotton thus obtained was fed to a web forming machine to form a web having a weight and thickness as shown in Table 1.

A nonwoven fabric composed of the electrically charged synthetic fiber web thus obtained was fed between co-operating embossing and flat rolls at a speed of 5 m/min under various temperature conditions as shown in Table 1, and the nonwoven fabric was embossed at an embossing ratio as shown in Table 1 to prepare a filter. Each filter thus prepared was subjected to various tests according to procedures as mentioned below.

The thus obtained filter was aged for 8 hours with clean air (containing a dust having a particle diameter of larger than 0.17 micron in an amount of 1 piece/15 liter for an average period of 10 minutes) at a rate of 5 m³/min (p=20 mmH₂O). Subsequently, the above-mentioned clean air was passed through the filter at a rate of 0.4 m³/min, and the number of dust particles having a particle size larger than 0.17 micron contained in a sample unit of 15 liter of the air passing through the filter was counted by means of a laser type particle counter TS-1500 manufactured and sold by Hitachi Densi Engineering K. K.

COMPARATIVE EXAMPLES 1-2

A nonwoven fabric composed of an electrically charged synthetic fiber web obtained in the same manner as in Examples 1-7 was embossed (Comparative Example 1) at a temperature of 100° C. which is lower by 50° C. than the softening temperature of said nonwoven fabric and separately, the same nonwoven fabric as above was embossed at a temperature of 160° C. which is higher than the aforesaid softening temperature (Comparative Example 2). These nonwoven fabrics thus treated were tested likewise to obtain the results as shown in Table 1.

COMPARATIVE EXAMPLE 3

A film obtained by the blown-film extrusion method in the same manner as Examples 1-7 was thermally embossed under the conditions as indicated in Table 1 without subjecting to electretirically charge. The film was then electrically charged in the same manner as in Examples 1-7 and tested likewise to obtain the results as shown in Table 1. A value of scavenging efficiency of the filter as prepared was found to be lower than the values of the filters of Examples 1-7, that is, said value measured was 53.2%.

COMPARATIVE EXAMPLES 4-5

Using nonwoven fabric composed of an electrically charged synthetic fiber web obtained in Examples 1-7, there were prepared filters by the following needle punching treatment and ultrasonic welding techniques, respectively. The filters obtained were tested to obtain the results as shown in Table 1.

Needle Punching Treatment Technique

A specimen was obtained by needle punching an electrically charged synthetic fiber web with a needle punching machine manufactured and sold by Feler Co. under the conditions a punch number of 35N/cm² and a needle depth of 12 mm.

Ultrasonic Welding Technique

A specimen was obtained by ultrasonically welding an electrically charged synthetic fiber web with an ultrasonic welding machine Sonopet-1000B manufactured and sold by Seidensha K. K. at a molded speed of 5 m/min and a pressure of 2 kg/cm².

MEASUREMENT METHOD

Filtering Efficiency

A rough sketch of the apparatus is shown in FIG. 1. NaCl particles (particle diameter: 0.3μ) were fed to a chamber 2 by means of clean air from an aerosol generator 1 manufactured and sold by Nippon Kagaku Kogyo K. K. After the particle concentration reached a given concentration (2-6×10⁶ piece/CF), a blower 3 was operated, and when a given velocity ($\gamma$=10 cm/sec) of the clean air containing NaCl particles was attained, NaCl particle concentrations at the sides of the upper stream and lower stream, respectively, relative to an electret filter 4 were measured with a particle counter-KC-01A 5 to calculate a filtering efficiency E according to the following equation.

$$\text{Filtering efficiency } E = \left(1 - \frac{C_{OUT}}{C_{IN}}\right) \times 100(\%)$$

Pressure Loss

In the above-mentioned apparatus, a pressure loss before and after the filter at $\nu$=10 cm/sec was measured with a digital pressure gauge manufactured and sold by Tokyo Kokukeiki K. K.

Number of Dust Particles

The electret filter was aged for 8 hours with clean air (containing a particle having a particle diameter of larger than 0.17 micron in an amount of 1 piece/15 liter for an average period of 10 minutes) at a rate of 5 m$^3$/min ($\Delta p=20$ mmH$_2$O). Subsequently, the above-mentioned clean air was passed through the filter at a rate of 0.4 m$^3$/min, and the number of dust particles having a particle size larger than 0.17 micron contained in a sample unit of 15 liter of the air passing through the filter was counted by means of a laser type particle counter TS-1500 manufactured and sold by Hitachi Densi Engineering K. K.

Strength

The measurement was conducted according to JIS-L1085.

Thickness

The measurement was conducted according to JIS-L1085.

Weight

The measurement was conducted according to JIS-L1085.

Fluffiness

Ratings of 1 to 5 were visually assigned.
(Good) 1-5 (Bad)

The reinforced type electret filter thus obtained was evaluated for performance to find that the filter was tough and high in self-supporting properties and favorable in fabrication quality.

A filtering efficiency and pressure loss of this reinforced type filter were measured likewise. The pressure loss was a value measured at $v=1.2$ m/sec.

REFERENTIAL EXAMPLE 1

The electrically charged synthetic fiber web used in Example 8 was evaluated for performance in the same manner as in Example 1.

The results obtained are shown in Table 2.

REFERENTIAL EXAMPLE 2

A filter medium was prepared by heat sealing the four sides of a reticular product made of polyester (a product of Toyobo Co. sold under a trade name of "Rassermesh RE-20", weight: 60 g/m$^2$, size: 40 deniers, mesh size: 1.5 mm×2.0 mm) used in a commercially available air cleaning filter (RB-A201) for Toshiba air conditioner to the four sides of a nonwoven fabric composed of an electrically charged synthetic fiber web.

The filter medium thus obtained was evaluated for performance in the same manner as in Example 8.

The results obtained are shown in Table 2.

REFERENTIAL EXAMPLES 3-4

Example 8 was repeated except that the embossing was carried out at the fusion bonding temperatures of 155° C. and 110° C.

The results obtained likewise are shown in Table 2.

REEFERENTIAL EXAMPLE 5

Example 8 was repeated except that the nonwoven fabric composed of an electrically charged synthetic fiber web was integrated with Netron into a solid structure by using ultrasonic welding technique in place of the thermoembossing roll technique.

The results obtained likewise are shown in Table 2.

TABLE 1

| Experiment | Treatment method | Weight (g/m$^3$) | Thickness (mm) | Emboss molding conditions Temp. (°C.) | Pressure (kg/cm$^3$) | Embossing ratio (%) | P (mm H$_2$O) | E (%) | Strength (lengthwise) (g/5 cm) | Dust particle (p'ce/15) | Fluffiness |
|---|---|---|---|---|---|---|---|---|---|---|---|
| Ex. 1 | Thermo-embossing | 70 | 0.63 | 135 | 2 | 4.5 | 2.1 | 70.0 | 2000 | 0.5 | 1 |
| Ex. 2 | " | 100 | 0.82 | 135 | 2 | 4.5 | 3.5 | 87.8 | 2900 | 0.6 | 1 |
| Ex. 3 | " | 130 | 1.01 | 135 | 2 | 4.5 | 4.0 | 94.4 | 3700 | 0.6 | 1 |
| Compar. Ex. 1 | " | 100 | 0.91 | 100 | 2 | 4.5 | 3.1 | 94.1 | 1100 | 2.3 | 4 |
| Ex. 4 | " | 100 | 0.84 | 125 | 2 | 4.5 | 3.7 | 89.2 | 2700 | 0.5 | 1 |
| Ex. 5 | " | 100 | 0.80 | 145 | 2 | 4.5 | 3.5 | 86.8 | 3200 | 0.6 | 1 |
| Compar. Ex. 2 | " | 100 | 0.70 | 160 | 2 | 4.5 | 4.5 | 45.3 | 4900 | 0.5 | 1 |
| Ex. 6 | " | 100 | 0.88 | 135 | 2 | 2.5 | 2.7 | 88.5 | 1300 | 0.7 | 1 |
| Ex. 7 | " | 100 | 0.80 | 135 | 2 | 37.5 | 7.3 | 68.5 | 3700 | 0.6 | 1 |
| Compar. Ex. 3 | Charged after thermo-embossing | 100 | 0.83 | 135 | — | 4.5 | 3.6 | 53.2 | 2800 | — | 1 |
| Compar. Ex. 4 | Needle punching | 100 | 2.2 | — | 2 | — | 0.7 | 80.0 | 800 | 156 | 5 |
| Compar. Ex. 5 | Ultrasonic welding | 100 | 1.5 | — | 2 | 7.1 | 1.6 | 85.4 | 5200 | 13.8 | 5 |

EXAMPLE 8

A nonwoven fabric composed of an electrically charged synthetic fiber web was fed, together with Netron (a product of Mitsui Petrochemical Industrial Materials Co., Ltd., weight: 65 g/m$^2$, mesh size: 5 mm×4 mm), between co-operating embossing and flat rolls to obtain a reinforced type electret filter comprising the electrically charged synthetic fiber nonwoven fabric integrated with Netron.

TABLE 2

| | Weight of filter medium [g/m$^2$] | Reticular product Weight [g/m$^2$] | Mesh size [mm] | Fusion bonding conditions Fusion bonding technique | Embossing ratio [%] | Temperature [°C.] | Pressure [kg/cm$^2$] | Speed [m/min] |
|---|---|---|---|---|---|---|---|---|
| Ex. 8 | 25 | 65 | 5 × 4 | Thermo- | 4.5 | 133 | 3 | 5 |

TABLE 2-continued

| | | | | | | | | |
|---|---|---|---|---|---|---|---|---|
| Ref. Ex. 1 | 25 | 0 | — | Thermo-embossing | 4.5 | 133 | 3 | 5 |
| Ref. Ex. 2 | 25 | 60 | 1.5 × 2 | Four-side heat sealing | — | — | — | — |
| Ref. Ex. 3 | 25 | 65 | 5 × 4 | Thermo-embossing | 4.5 | 155 | 3 | 3 |
| Ref. Ex. 4 | 25 | 65 | 5 × 4 | Thermo-embossing | 4.5 | 110 | 3 | 5 |
| Ref. Ex. 5 | 25 | 65 | 5 × 4 | Ultrasonic welding | 5.5 | — | 3 | 5 |

| | Filtering Efficiency [%] | Pressure loss [mm HO] | Toughness | Self-supporting properties | Fabrication quality |
|---|---|---|---|---|---|
| Ex. 8 | 15 | 3.0 | o | o | o |
| Ref. Ex. 1 | 15 | 2.6 | x | x | x |
| Ref. Ex. 2 | 15 | 2.8 | o | o | Δ |
| Ref. Ex. 3 | 8 | 2.9 | o | o | o |
| Ref. Ex. 4 | 16 | 2.8 | o | x | x |
| Ref. Ex. 5 | 15 | 2.7 | o | o | x |

What is claimed is:

1. A reinforced type electret filter which comprises a nonwoven fabric composed of an electrically charged synthetic fiber web having embossed surface portions and a reticular product made of a synthetic fiber, only the surface of embossed portions of aid nonwoven fabricd being fused and said nonwoven fabric and said reticular product being in contact with each other, substantially all the contacting portions of said nonwoven fabric and the fiber constituting said reticular product being thermowelded.

2. The fiber as claimed in claim 1 wherein the nonwoven fabric composed of an electrically charged synthetic fiber web has a surface electrical charge of 10–40×10$^{-9}$ coulomb/cm$^2$.

3. The reinforced type electret filter as claimed in claim 1 wherein the electrically charged synthetic fiber of the nonwoven fabric is made of a resin composition of polypropylene, polycarbonate and maleic acid-modified polypropylene.

4. The reinforced type electret filter as claimed in claim 1 wherein the embossed portion of the electret filter is 3–10% of the total surface area of the filter.

5. The reinforced type electret filter as claimed in claim 1 wherein the nonwoven web is prepared by fibrillating the electrically charged film, cutting the fibrillated fiber to a desired length and making the fiber obtained into cotton form with a cotton opener.

6. A reinforced type electret filter which comprises a nonwoven fabric composed of an electrically charged synthetic fiber web having embossed surface portions and a reticular product made of a synthetic fiber, only the surface of embossed portions of said nonwoven fabric being fused, wherein said embossed fused portions comprise 2 to 35% of the surface area of the filter, and said nonwoven fabric and said reticular product being in contact with each other, substantially all the contacting portions of said nonwoven fabric and the fiber constituting said reticular product being thermowelded.

7. A process for preparing an electret filter which comprises feeding a nonwoven fabric composed of an electrically charged synthetic fiber web at a temperature lower by 5° to 50° C. than a softening temperature of said synthetic fiber with a reticular product made of a synthetic fiber between cooperating embossing and flat rolls to emboss portions of the surface of said synthetic fiber web, thereby fusing only the surfaces of embossed portions of said nonwoven fabric and sumultaneously thermowelding almost all the contacting portions of said nonwoven fabric and the synthetic fiber constituting said reticular product to integrate said nonwoven fabric and said reticular product into a solid structure.

8. The process as claimed in claim 7 wherein the nonwoven fabric composed of an electrically charged synthetic fiber web has a surface electrical charge of 10–40× $^{-9}$ coulomb/cm$^2$.

9. A process according to claim 7 wherein the nonwoven synthetic fiber web has a weight of 70-130 g/m$^2$.

10. A process according to claim 7 wherein the nonwoven synthetic fiber has a surface charge density of 25-35×10$^{-19}$ coulomb/cm$^2$.

11. A process according to claim 7 wherein the reticular product has a weight of 50-80 g/m$^2$.

12. A process according to claim 7 wherein the reticular product consists of synthetic fibers within the size range of 10-1000 deniers.

13. A process according to claim 1 wherein the temperature is 20°-30° C. below the softening temperature of the synthetic fiber.

14. A process according to claim 7 wherein the speed at which the reticular product and non-woven fabric are fed between the rollers is 1-20 m/min.

15. The process as claimed in claim 7 wherein the speed at which the nonwoven fabric is fed between the rollers is 1-20 m/min.

16. The process as claimed in claim 7 wherein the electrically charged synthetic fiber of the nonwoven fabric is made of a resin composition of polypropylene, polycarbonate and maleic acid-modified polypropylene.

17. The process as claimed in claim 7 wherein the embossed portion of the electret filter is 3–10% of the total surface area of the filter.

18. The process as claimed in claim 7 wherein the nonwoven web is prepared by fibrillating the electrically charged film, cutting the fibrillated fiber to a desired length and making the fiber obtained into cotton form with a cotton opener.

19. A process for preparing an electret filter which comprises feeding a nonwoven fabric composed of an electrically charged synthetic fiber web at a temperature lower by 5° to 50° C. than a softening temperature of said synthetic fiber with a reticular product made of synthetic fiber between cooperating embossing and flat rolls to emboss portions of the surface of said synthetic fiber thereby fusing only the surfaces of embossed portions of said nonwoven fabric, wherein said embossed fused portions comprise 2 to 35% of the surface area of the filter, and simultaneously thermowelding almost all the contacting portions of said nonwoven fabric and the synthetic fiber constituting said reticular product to integrate said nonwoven fabric and said reticular product into a solid structure.

* * * * *